United States Patent
Andelman

(10) Patent No.: US 6,781,817 B2
(45) Date of Patent: Aug. 24, 2004

(54) FRINGE-FIELD CAPACITOR ELECTRODE FOR ELECTROCHEMICAL DEVICE

(75) Inventor: Marc D. Andelman, Worcester, MA (US)

(73) Assignee: Biosource, Inc., Worcester, MA (US)

( * ) Notice: Subject to any disclaimer, the term of this patent is extended or adjusted under 35 U.S.C. 154(b) by 0 days.

(21) Appl. No.: 10/398,698
(22) PCT Filed: Oct. 2, 2001
(86) PCT No.: PCT/US01/30760
§ 371 (c)(1), (2), (4) Date: Apr. 2, 2003
(87) PCT Pub. No.: WO02/29836
PCT Pub. Date: Apr. 11, 2002

(65) Prior Publication Data
US 2004/0012913 A1 Jan. 22, 2004

Related U.S. Application Data
(60) Provisional application No. 60/237,242, filed on Oct. 2, 2000, and provisional application No. 60/293,720, filed on May 26, 2001.

(51) Int. Cl.[7] .................................................. H01G 9/00
(52) U.S. Cl. .................... 361/503; 361/502; 361/504; 361/508; 361/509; 361/516; 361/528
(58) Field of Search ................................. 361/503, 502, 361/504, 508, 509, 510, 511, 516, 523, 525, 528, 433; 429/305, 306

(56) References Cited

U.S. PATENT DOCUMENTS

| | | |
|---|---|---|
| 3,244,612 A | 4/1966 | Murphy |
| 3,404,061 A | 10/1968 | Shane et al. |
| 3,515,664 A | 6/1970 | Johnson et al. |
| 3,658,674 A | 4/1972 | Benak |
| 3,808,534 A | 4/1974 | Summers et al. |
| 3,930,094 A | 12/1975 | Sampson et al. |
| 4,102,960 A | 7/1978 | Borkowski |
| 4,238,721 A | 12/1980 | DeLuca et al. |

(List continued on next page.)

FOREIGN PATENT DOCUMENTS

| | | |
|---|---|---|
| EP | 0 436 436 B1 | 8/1994 |
| JP | 9320906 A2 | 12/1997 |
| WO | WO 94/26669 | 11/1994 |
| WO | WO 95/12674 | 8/1995 |

(List continued on next page.)

OTHER PUBLICATIONS

U.S. patent application Ser. No. 10/015,120, Andelman et al., filed Oct. 26, 2001.
U.S. patent application Ser. No. 10/048,632, Andelman, filed Jan. 30, 2002.
U.S. patent application Ser. No. 10/220,779, Andelman, filed Sep. 04, 2002.

(List continued on next page.)

Primary Examiner—William H Mayo
Assistant Examiner—Nguyen T. Ha
(74) Attorney, Agent, or Firm—Leslie Meyer-Leon, Esq.; IP Legal Strategies Group P.C.

(57) ABSTRACT

The invention features an electrochemical device which includes at least two capacitor electrodes 16, each of which includes a conductive material characterized in that at least ten percent (10%) of the overall surface area of the conductive material is an edge plane. In contrast to a basal plane, the electric field along an edge plane is distorted so as to exhibit an 'edge effect or 'fringe effect. Capacitor electrodes 16 with many edges, points, corners, or fractal surfaces exhibit greater capacitance per unit volume or mass amount of capacitor electrode material, than do materials in which the surface area of the material is predominately basal plane. An electrochemical device of the invention can be, for example, an electrochemical cell, e.g., a battery, a capacitor, or a flow-through capacitor.

32 Claims, 6 Drawing Sheets

U.S. PATENT DOCUMENTS

| | | | |
|---|---|---|---|
| 4,719,401 A | 1/1988 | Altmejd |
| 4,752,518 A | 6/1988 | Lohrke et al. |
| 5,094,732 A | 3/1992 | Oldani et al. |
| 5,150,283 A | 9/1992 | Yoshida et al. |
| 5,192,432 A | 3/1993 | Andelman |
| 5,196,115 A | 3/1993 | Andelman |
| 5,200,068 A | 4/1993 | Andelman |
| 5,343,156 A | 8/1994 | Johnson et al. |
| 5,360,540 A | 11/1994 | Andelman |
| 5,415,768 A | 5/1995 | Andelman |
| 5,425,858 A | 6/1995 | Farmer |
| 5,476,734 A | 12/1995 | Pulley et al. |
| 5,538,611 A | 7/1996 | Otowa |
| 5,547,581 A | 8/1996 | Andelman |
| 5,558,753 A | 9/1996 | Gallagher et al. |
| 5,620,597 A | 4/1997 | Andelman |
| 5,636,437 A | 6/1997 | Kaschmitter et al. |
| 5,647,969 A | 7/1997 | Mao |
| 5,656,915 A | 8/1997 | Eaves |
| 5,706,165 A | 1/1998 | Saito et al. |
| 5,733,683 A | 3/1998 | Searson et al. |
| 5,748,437 A | 5/1998 | Andelman |
| 5,764,027 A | 6/1998 | Harvey |
| 5,773,957 A | 6/1998 | Imaseki |
| 5,776,384 A | 7/1998 | Firsich et al. |
| 5,779,891 A | 7/1998 | Andelman |
| 5,793,603 A | 8/1998 | Lyman |
| 5,821,733 A | 10/1998 | Turnbull |
| 5,886,503 A | 3/1999 | McAndrews et al. |
| 5,910,237 A | 6/1999 | Moulton et al. |
| 5,925,230 A | 7/1999 | Fajt et al. |
| 5,954,937 A | 9/1999 | Farmer |
| 5,969,505 A | 10/1999 | Okamura |
| 5,977,015 A | 11/1999 | Fajt et al. |
| 5,980,718 A | 11/1999 | Van Konynenburg et al. |
| 5,982,143 A | 11/1999 | Stuart |
| 5,985,452 A | 11/1999 | Mercuri |
| 6,045,685 A | 4/2000 | Fajt et al. |
| 6,074,775 A | 6/2000 | Gartstein et al. |
| 6,094,788 A | 8/2000 | Farahmandi et al. |
| 6,096,179 A | 8/2000 | Fajt et al. |
| 6,127,474 A | 10/2000 | Andelman |
| 6,143,218 A | 11/2000 | Mercuri |
| 6,149,972 A | 11/2000 | Greinke |
| 6,214,204 B1 | 4/2001 | Gadkaree et al. |
| 6,249,089 B1 | 6/2001 | Bruwer |
| 6,309,532 B1 | 10/2001 | Tran et al. |
| 6,325,907 B1 | 12/2001 | Andelman |
| 6,346,187 B1 | 2/2002 | Tran et al. |
| 6,413,409 B1 | 7/2002 | Otowa et al. |
| 6,426,864 B1 * | 7/2002 | O'Phelan et al. ............ 361/509 |
| 6,444,339 B1 * | 9/2002 | Eshraghi ...................... 429/26 |
| 6,628,505 B1 | 9/2003 | Andelman |
| 6,653,018 B2 * | 11/2003 | Takahashi et al. ........... 429/185 |
| 6,664,006 B1 * | 12/2003 | Munshi ...................... 429/305 |
| 2002/0017463 A1 | 2/2002 | Merida-Donis |

FOREIGN PATENT DOCUMENTS

| | | |
|---|---|---|
| WO | WO 97/13568 | 4/1997 |
| WO | WO 98/11767 | 3/1998 |
| WO | WO 98/15962 | 4/1998 |
| WO | WO 00/14304 | 3/2000 |
| WO | WO 01/09907 A1 | 2/2001 |
| WO | WO 01/13389 A1 | 2/2001 |
| WO | WO 01/45121 A1 | 6/2001 |
| WO | WO 01/66217 A1 | 9/2001 |
| WO | WO01/89656 A1 | 11/2001 |
| WO | WO01/89671 A1 | 11/2001 |
| WO | WO01/90443 A1 | 11/2001 |
| WO | WO01/90444 A1 | 11/2001 |
| WO | WO 01/95410 A1 | 12/2001 |
| WO | WO01/96245 A1 | 12/2001 |
| WO | WO02/29836 A1 | 4/2002 |
| WO | WO02/086195 A1 | 10/2002 |
| WO | WO03/009920 A | 2/2003 |

OTHER PUBLICATIONS

U.S. patent application Ser. No. 10/297,640, Andelman et al., filed Jun. 17, 2003.

U.S. patent application Ser. No. 10/316,560, Andelman, filed Dec. 11, 2002.

Z.F. Ren et al., "Synthesis of Large Arrays of Well–Aligned Carbon Nanotubes on Glass, " *Science*, Nov. 6, 1998, pp. 1105–1107, vol. 282.

Z.P. Huang et al., "Growth of Highly Oriented Carbon Nanotubes by Plasma–Enhanced Hot Filament Chemical Vapor Deposition," *Applied Physics, Letters*, Dec. 1998, vol. 73, No. 26 28, Buffalo, New York.

Braun et al., "X–Ray Scattering and Adsorption Studies of Thermally Oxidized Glassy Carbon," *Journal of Non–Crystalline Solids*, 1999, pp. 1–14, 260, Switzerland.

Z.F. Ren et al., "Large Arrays of Well–Aligned Carbon Nantoubes," *Proceedings of the 13th International Winter School on Electronic Properties of Novel Materials*, Feb. 27 to Mar. 6, 1999, Kirchberg/Tirol, Austria.

Sullivan et al., "Thick Active Layers of Electrochemically Modified Glassy Carbon, Electrochemical Impedance Studies," *Journal of the Electrochemical Society*, 2000, pp. 308–317, 147 (1), Minneapolis, Minnesota.

HongJie Dai et al., "Single Wall Nanotubes Produced by Metal Catalyzed Disproportionation of Carbon Monoxide," *Chemical Physics Letters*, Sep. 27 1996, pp. 471–475, 260, Houston, Texas.

* cited by examiner

FRINGE-FIELD CAPACITOR ELECTRODE FOR ELECTROCHEMICAL DEVICE

REFERENCE TO PRIOR APPLICATIONS

This application is based on and claims priority from U.S. Provisional Patent Application Serial No. 60/237,242, filed Oct. 2, 2000, and U.S. Provisional Patent Application Serial No. 60/293,720, filed May 26, 2001, both applications are hereby incorporated by reference in their entirety.

GOVERNMENT CONTRACT

This invention was funded under contract with the Army Research Office, under Contract No. DAAD 19-00-C-0448. The United States Government may have certain rights in the invention.

BACKGROUND OF THE INVENTION

Electrochemical devices include electrochemical cells, such as fuel cells and batteries, redox batteries, flow-through capacitors, and energy storage capacitors. In order to achieve higher energy and charge densities in electrochemical devices, a need exists for greater energy and charge storage per unit volume or mass. Increased capacitance, in particular, is highly beneficial to many types of electrochemical cells, because higher capacitance increases the charge storage per unit mass or volume. Therefore, it is the object of the invention to provide electrochemical devices of very high capacitance.

SUMMARY OF THE INVENTION

The invention features an electrochemical device which includes at least two capacitor electrodes, each of which includes a conductive material characterized in that at least ten percent (10%) of the overall surface area of the conductive material is an edge plane. Any one or more of the capacitor electrodes may be an anode or a cathode. Where the device includes more than two capacitor electrodes, for example three or more capacitor electrodes, the capacitor electrodes can optionally be connected in series.

Generally, the surface area of a conductive material is made up of edge planes and basal planes. A conductive material suitable for use in a capacitor electrode of the invention is selected for a surface area in which edge plane is favored over basal plane. The edge planes are at least ten percent (10%) of the surface area of a material that is suitable for use in the invention, preferably 25%, or more preferably, 50% or higher. In contrast to a basal plane, the electric field along an edge plane is distorted so as to exhibit an 'edge effect' or 'fringe effect.'

Capacitance is a property of space whereby two conductors that are separated by an insulator store charge. Charges along conductive material that contains edges, corners, or points are greatly increased as compared to other surface charges. Due to the formula $C=Q/V$, increased charge density is tantamount to increased capacitance. Therefore, capacitor electrodes with many edges, points, corners, or fractal surfaces exhibit greater capacitance per unit volume or mass amount of capacitor electrode material, than do materials in which the surface area of the material is predominately basal plane. Thus, it is not necessary for the conductive material in the electrode to have a high surface area in order to exhibit high capacitance. The conductive material may be of either high surface area or low surface area, as long as the overall surface area has a high degree of edge plane. Whether a conductive material is characterized as having high versus low surface area is relative; low surface area carbon material is generally regarded as less than about 2000 Brunauer Emmettt Teller (B.E.T.) or for carbon black or powdered carbon generally less than about 1000 B.E.T. One advantage of using a conductive material of low surface area but high edge plane is to minimize oxidation, thereby prolonging the lifetime of the capacitor electrode.

An electrochemical device of the invention can be, for example, an electrochemical cell, e.g., a battery, a capacitor, or a flow-through capacitor.

Preferably, a capacitor electrode of the invention has a single electrode capacitance of at least 20 farads per cubic centimeter of conductive or electric material. A capacitor electrode of the invention can have a single electrode capacitance of at least 5 microfarads per square centimeter of surface area, where 'surface area' is used to refer to the overall surface area of the entire material, edge and basal planes combined.

Conductive materials suitable for use in capacitor electrodes may be of varying shapes. The edge planes of the conductive material can be located on one or more of a branch, dendrite, fork, jagged edge, fractal edge or surface, point, spine, or protrusion in the shape of the conductive material. In one embodiment, a capacitor electrode of the invention is prepared from a conductive material that includes particles of less than about 10 microns in diameter. The particles may be of any shape; preferably, the particles are spherical or fibrous. The surface area of the conductive material can be between 20 and 3000 square meters per gram material. Surface area is preferably measured by B.E.T., iodine number, or nitrogen absorption method.

A conductive material useful in a capacitor electrode of the invention may be a form of graphite, such as pyrolytic graphite or graphite particles. Alternatively, the conductive material can be a nanofiber, e.g., a nanofiber of less than 300 nanometers in diameter, or an aligned nanofiber, or a nanotube, or a form of thin carbon fibers that are, preferably, less than 100 microns in diameter. Other useful conductive materials may be carbon black, carbon nanoparticles, nanoporous carbon, activated carbon, or forms of carbon powder. The conductive material may also be a form of graphite that is mechanically aligned.

In another embodiment, a capacitor electrode of the invention can further include a binder material. Useful binder materials can be based on polymers known to those skilled in the art. The binder material can be, without limitation, a form of latex or a phenolic resin. Alternatively, the binder material can be a perfluorocarbon, a polymer that can be fibrillated into a polymer fiber, or a polytetrafluoroethylene (PTFE) polymer, preferably in the range of 2–20%. Preferably, the binder material is formed into a flexible sheet, e.g., a sheet of less than 0.03 inches thick, for example, between 0.005 and 1 inch thick or thicker if the electrode layers are laminated or extruded together with spacer and current collector layers in order to form a capacitor monolithic composite material. The binder material can be formed into such a sheet by, e.g., extrusion, calendaring, pressing, spray coating, or by adhering the binder material onto a current collector.

In another embodiment, the edge planes in a capacitor electrode of the invention can be protected by a layer of boron or by a layer of phosphorous.

A capacitor electrode of the invention can also include a current collector, which is preferably integral with, or in the same plane as, the conductive material, whereby "integral"

is meant the capacitor electrode is connected to the current collector mechanically, physically, and/or electrically. A "current collector" or "charge collector" provides a path for an electric current to and from the active material.

In another embodiment, the conductive material is a laminate applied to a particle. Preferably, the laminate can be graphite that is electrically integral with the current collector.

In one aspect, the electrochemical device of the invention is a flow-through capacitor. The flow-through capacitor optionally further includes a spacer layer. Preferably, the flow-through capacitor has a series resistance of less than 30 ohms per square centimeter of spacer layer. The capacitor electrode of the flow-through capacitor preferably includes one or more pores through which an aqueous, conductive solution can pass through the electrode. The edge planes of the conductive material can be located on the surface of the pores. Flow-through capacitors of the invention are particularly useful for removing ions from an aqueous medium so as to purify the aqueous medium. Preferably, the flow-through capacitor is able to remove at least 90% of the ions when the medium is a solution of 0.01M NaCl, the conductive material in the capacitor electrode is carbon, and the solution is allowed to flow through the flow-through capacitor at a flow rate of at least one milliliter per minute per gram of carbon at 2 Volts.

In a related aspect, the invention features a method of removing ions from an aqueous medium by providing a flow through capacitor which uses a capacitor electrode of the invention, and allowing a source of the aqueous medium to flow through the flow-through capacitor so as to remove the ions from the medium. Preferably, such a method achieves a 90% purification rate of a 0.01M NaCl solution of over 1 ml/minute/gram carbon at 2 volts.

In another related aspect, the invention features a method of making an electrochemical device, the method including the steps of providing at least two capacitor electrodes, each of the capacitor electrodes including a conductive material characterized in that at least 10% of the surface area of the conductive material is edge plane; and positioning a source of electrical current so as to provide electrical communication between the two capacitor electrodes. Preferably, the capacitor electrode has a capacitance of at least 20 farads per cubic centimeter of electrical material. The capacitor electrode can have a single electrode capacitance of at least 5 microfarads per square centimeter of surface area. The capacitor electrode also includes a binder material. In one embodiment, the binder material is formed into a flexible sheet, e.g., a sheet of less than 0.03 inches in thickness. The binder material may be PTFE, e.g., 2–20% PTFE. The sheet can be formed by extruding, by calendaring, by pressing, by spray coating, or by adhering the sheet onto a current collector.

DETAILED DESCRIPTION

Figure 1:
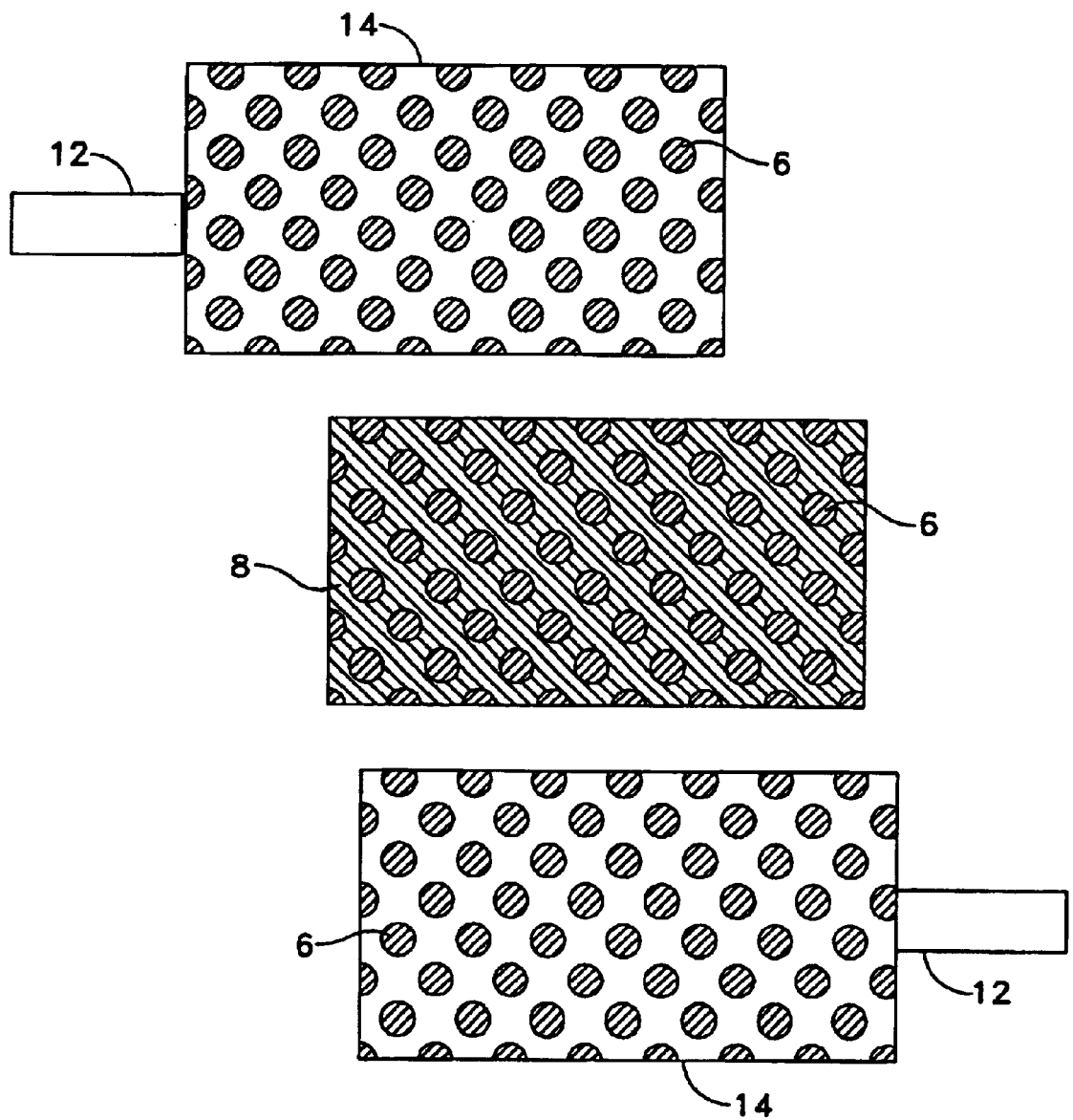
FIG. 1 illustrates one embodiment of an electrochemical device of the invention, including two capacitor electrodes, either of which are anodes or cathodes, an incoming lead an outgoing lead, a spacer, and pores in the form of through holes.

FIG. 1 shows an electrode arrangement in an electrochemical device, with leads 12, anodes or cathodes 14, spacer 8, and through holes 6. Such an arrangement is suitable for either through-hole, transverse, or parallel flow-through capacitors. If holes 6 are used as a flow path, holes may optionally be aligned. Although depicted in FIG. 1 as through holes 6, these pores may take other shapes or forms, such as slots. In cases where the "hole" is not used for a flow path, any shape cut may be used which exposes the edge planes 3, such as, without limitation, a trench, pit, or groove.

Figure 2:
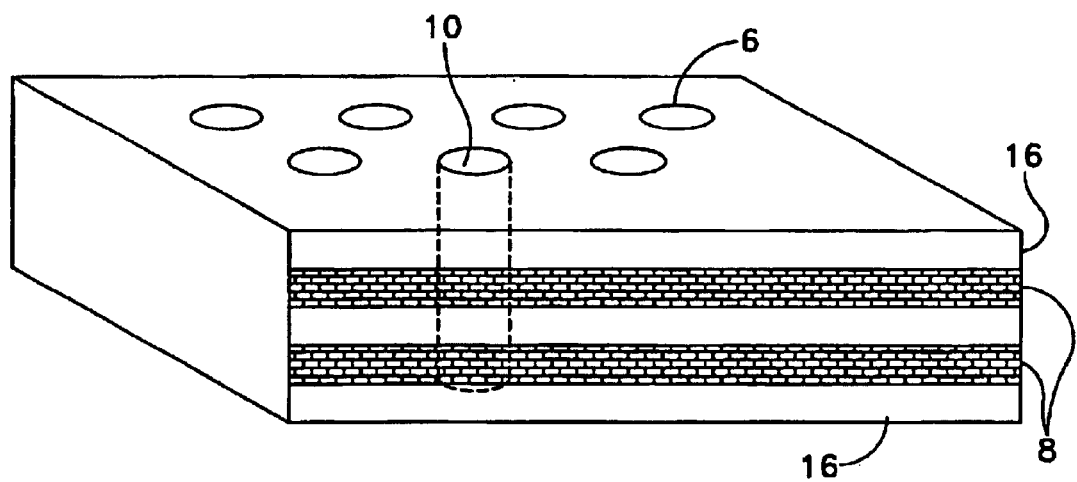
FIG. 2 illustrates an embodiment of the invention in which a stacked layer of electrodes are separated by spacer layers, and perpendicular through holes form channels for the flow of fluid.

FIG. 2 is a stack of spaced-apart, alternating electrodes 16. The spacer may be a dielectric nonporous material with a flow path, with flow perpendicular to the electrodes 16 or electrodes 16 with its current collector, and with the spacer through holes 6 aligned with the electrode holes. Alternatively, the spacer itself may form a flow channel with flow parallel to the electrodes 16, either within the spacer material itself or by merely spacing or shimming apart the electrodes to form a flow path. Electrodes 16 may be any micro, meso, or nano planar material with exposed edge planes 3, for example, skived laminated graphite foil or graphite foil with many small cuts, pores, holes, slots, or trenches.

A major advantage of using a flat sheet version of this invention is that it provides for a high capacitance material integral with and in the same plane as the current collector. This allows for development of flow-through capacitors with the geometry of FIG. 2. Integral current collectors which include a high capacitance material, or which are coplanar with capacitance-containing material, also allow for the use of very thin spacer layers. High capacitance carbon may be formed into arrays of pores, for example, holes, wells, pits, slots, trenches, or other shapes. The pores can be cut into graphite and held in place by a binder material. Where the conductive material is a particulate, the particles of the high capacitance material are held inside the current collector. This avoids short circuiting through the spacer material and is what allows the use of extremely thin spacers. A spacer less than 0.020 inches may be used, ideally, less than 0.005 inches.

Figure 3:
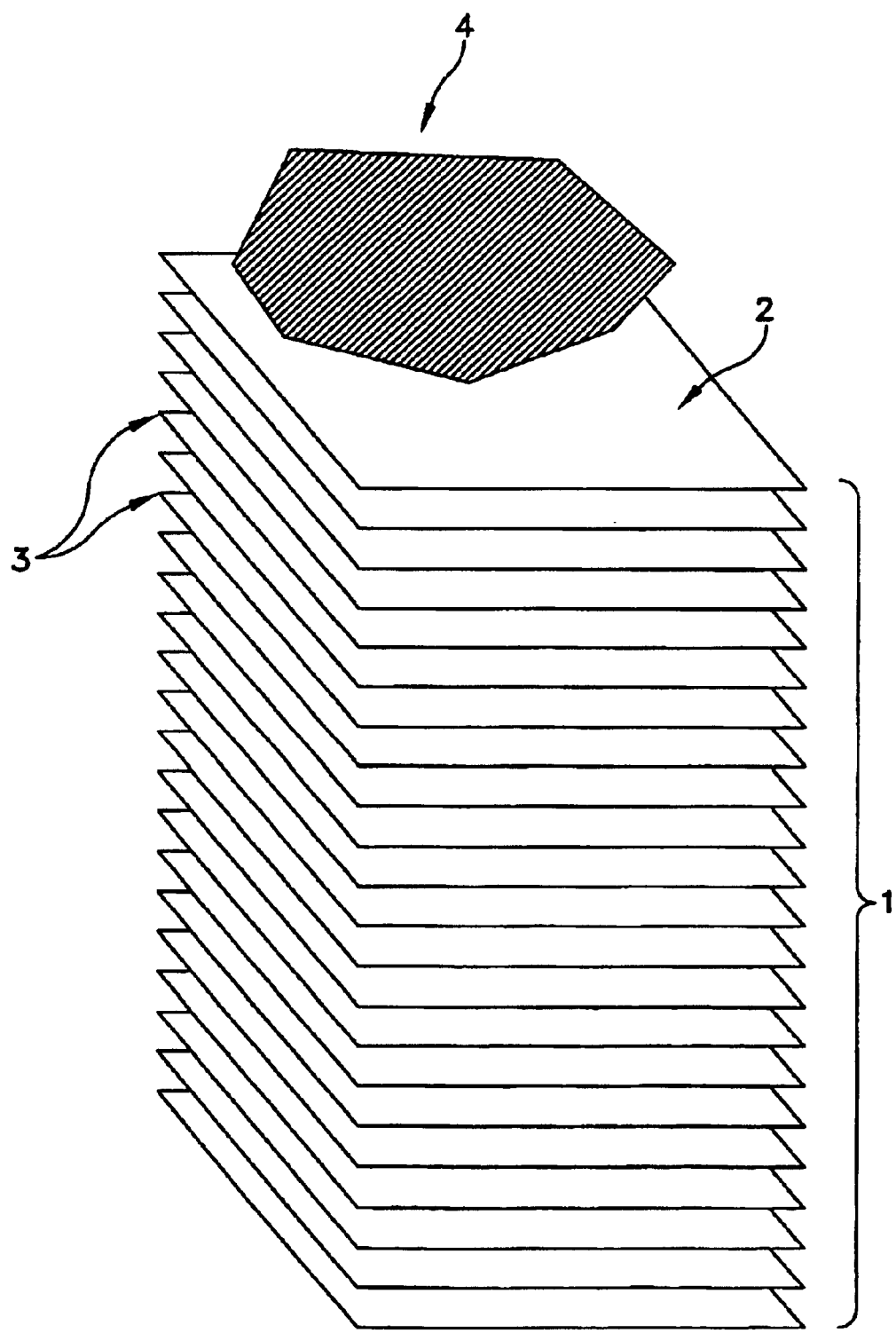
FIG. 3 illustrates a graphite nanofiber which can be used to prepare a capacitor electrode with many edge planes to enhance fringe-field capacitance.

FIG. 3 represents a graphite nanofiber 1 for use in fringe-field electrodes 16 of the present invention. The cross section of the electrode may be any shape. Fibers may also be cylindrical. The only requirement is that the fibrous material contains layered conductive materials with planar layers having edges, points, projections, or sharp edges, and that the edges, projections, points, or sharp edges are exposed. The edge planes are composed of multiple parallel layers of graphite 2 with exposed edge planes 3. The graphite layers here are typically more or less the Van der Wahl's distance apart, less than 1 nm, for example, 0.34 nm, but may be between 1 angstrom and 100 microns apart. This spacing may be increased from 0.34 nm by introducing or intercalating groups between the layers. These fibers can be from one micron to over 1000 microns long, and as thin as 1 nanometer to 1 micron in diameter. Preferably, they are less than 300 nanometers in diameter, such as between 1 and 70, or between 5 and 70 nanometers, wide. Optionally, a catalyst or metal particle 4 may be used to generate this structure.

Figure 4:
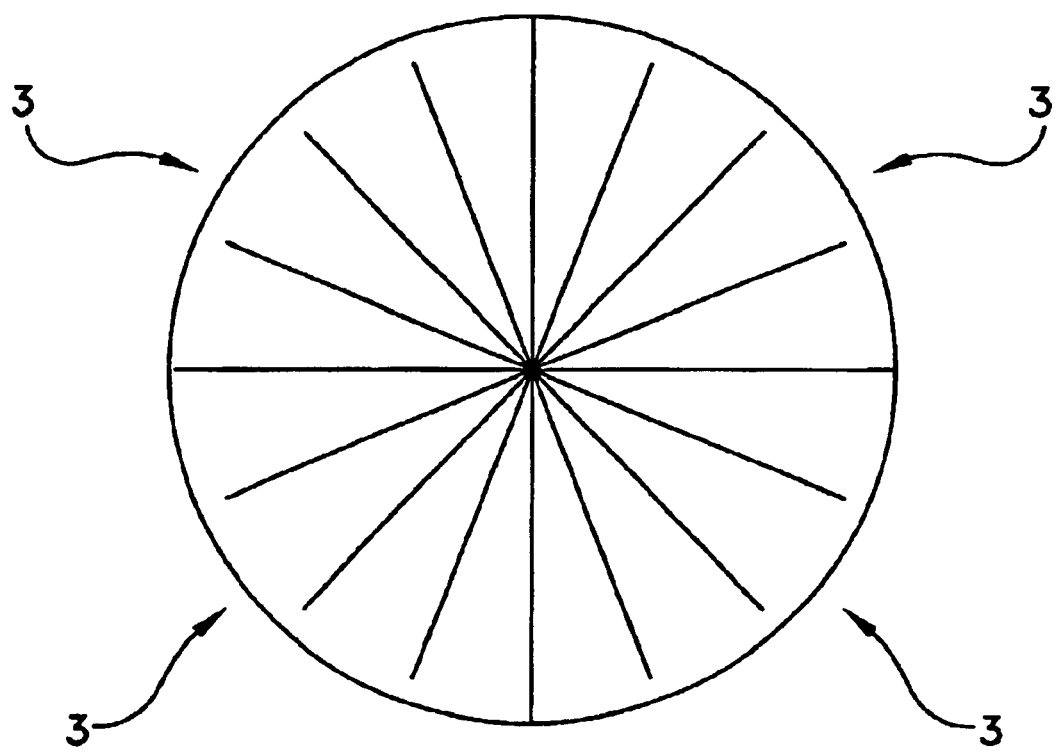
FIG. 4 illustrates a radial edge plane structure for use as a capacitor (fringe-field) electrode of the invention.

FIG. 4 represents a radial edge plane structure for use in the electrodes 16 of the present invention. This may be either a cross section of a cylindrical fiber or a spherical structure. Any edge plane particle, fiber, foil, sphere or other shape of conductive material, including materials which form edge planes 3 upon carbonization, such as polyimide or polymers, may be used. For example, mesophase pitch fibers or spheres may be carbonized to form edge plane structures. Electrospun fibers may also be used. Carbonizeable spheres in the 0.1 to 100 micron size make excellent edge plane particles when pyrolyzed for use in the present invention.

Other geometries include box or rectangular shapes with numerous edge planes 3 along one or more sides. For example, fine graphite particles in the 0.1 to 100 micron size range may be used, for example, mixed together with PTFE binder to form a sheet material.

Figure 5:
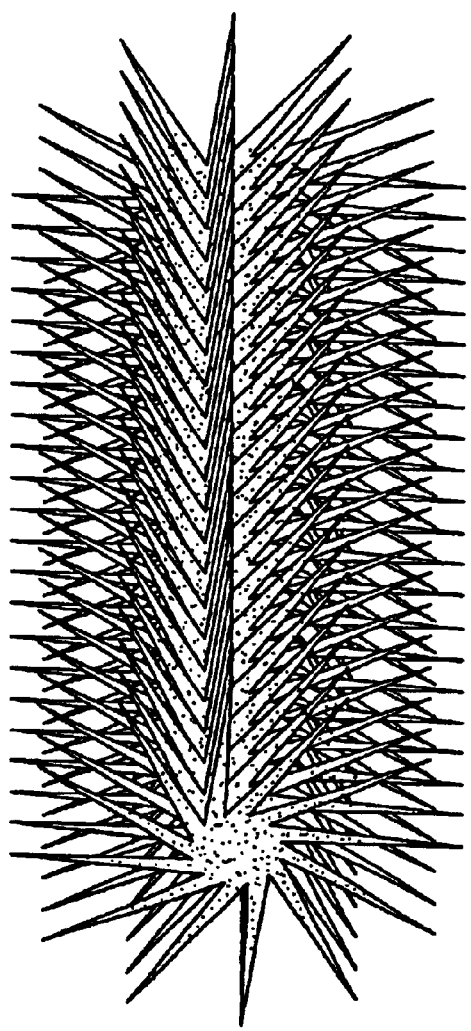
FIG. 5 illustrates a material having a high percentage of its surface as edge plane.
Figure 6:
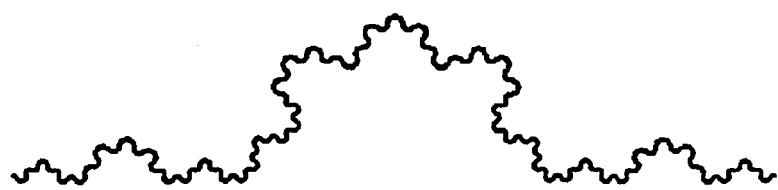
FIG. 6 illustrates a fractal or jagged-edge plane material for use in enhancing fringe-fields in a capacitor electrode of the invention.

One preferred embodiment is a structure with many fine points, for example, dendritic, branched, forked, spined, quilled, or multiple single-points, e.g., a structure with many fine conductive points, spines, jagged edges, or projections, such as the one shown in FIG. 5. Fractal or jagged-shaped materials, such as shown in FIG. 6, may also be used in the electrodes 16 of the present invention. For example, the shape may be indented along the edge plane to increase the edges and points on the surface area. Edges, points, or protrusions are especially effective where the thin edges or points are less than 1 micrometer wide.

FIG. 5 shows conductive material with many protruding points for use as a high capacitance electrode 16. Charge concentration at points from fringe-field effect leads to high capacitance, over 100 farads per gram of conductive material. The surface material shown in FIG. 5 is greater than 50% edge plane and can approach as much as 75%, or 90%, or almost 100% edge plane.

FIG. 6 shows fractal or jagged-edge plane material for use in the fringe-field electrode 16 of the present invention.

Generally suitable conductive materials are those that have a layered structure in which layer edges and/or points may be exposed by means of pores, holes, slots, indentations or any other geometric-shaped indentations will suffice for purposes of this invention. The conductive material may be in sheet, rod, or fiber form, as long as the edge planes may be accessed by cutting through the material, either partially or all the way, to cut across the edge planes. For example, troughs may be reacted, etched, or cut into a sheet material. Holes may be drilled, etched, or chemically etched into a concentric cylinder material or layered material. Edges may be exposed in a radial fiber material. Oxygen, oxygen-containing groups, halogen or fluorine-containing groups, ionic groups, or other effective groups may be added onto the edge planes to enhance hydrophilicity, hydrophobicity, capacitance, stability, or performance of the material when used as an electrode. Edge planes may further be derivitized with boron or phosphorous in order to enhance stability of the electrode material. Chemical, electrochemical, oxidizing, or reducing technique can be used to etch multiple pores in the conductive material, e.g., pores of under 500 nm in size. Large pores, over 100 nm in size, may be mixed in with smaller pores in order to provide access of electrolyte throughout the material into the smaller pores. By so choosing electrode materials with enough edge planes, surface-specific microcapacitance is increased. Specifically for use as electrode materials in flow-through capacitors, selection of any material with exposed edge planes that provide a surface-specific microcapacitance of over 5 microfarads per square centimeter of surface area, as measured by the BET or nitrogen adsorption method will suffice for purposes of this invention.

Flow-through capacitors include, but are not limited to, U.S. Pat. Nos. 5,748,437; 5,192,432; 5,196,115; 5,200,068; 5,360,540; 5,415,768; 5,547,581; 5,620,597; 5,779,891; 5,538,611; Japan Patent Application No. 18004/1993; PCT International Application No. US92/11358; PCT International Application No. US95/01635; Japanese Patent Application No. 521326/1995; PCT International Application No. US94/05364; PCT International Application No. US96/16157; Japanese Patent Application No. Toku-gan-hei 10-253706, each of which is hereby incorporated by reference.

Selection of a conductive material for use in capacitor electrodes for the electrochemical devices of the invention, e.g., capacitors, fuel cells, electrochemical cells, and flow-through capacitors where over 10% of the exposed surface is edge plane, are optimal embodiments of this invention. For example, edge plane nanofibers, edge plane carbon fibers, edge plane carbon spheres, edge plane conductive ceramics or polymers of the above shapes may optimally be used. Graphitic material with exposed edge planes, including graphite fibers, particles, platelets, fibers, or foil may be incorporated into an electrode material of the present invention. Edge plane nanofibers are an embodiment of the invention, due to the fact that between 50% and 100% of their exposed surface area represent edge planes. Optionally, the above materials may be activated in order to increase surface area.

Materials with a high degree of edge plane have high capacitance, typically over 20 farads per gram, and over 20 farads per cubic centimeter (cc) of material. Such materials also have high capacitance per unit pore volume, typically over 20 farads per cc of pore volume. Farads in the present invention refer to the capacitance of a single electrode and are measured either in 0.6 M NaCl at neutral pH or in concentrated sulfuric acid.

In a flow-through capacitor, farads per gram may also be measured in whatever the feed concentration of interest to be purified is. This electrode of the invention increases performance when used in a flow-through capacitor at all concentrations, especially at high solution concentrations, over 500 ppm. Because edge plane material has more concentrated capacitance, fewer cubic centimeters of material need be used to achieve a given capacitance. For a given capacitance, for example, less than 0.1 cc of material is required per farad of capacitance. High volumetric capacitance of over 20 farads per gram is highly advantageous to decrease electrical series resistance (ESR), due to the fact that less mass of electrode material is in the way of ionic conduction. Low ESR allows higher flow rates per gram of electrode carbon material for use in flow-through capacitors. This performance is measured by recording the flow rate to achieve a 90% drop in outlet solution concentration as compared to the feed concentration, while applying either 1 or 2 volts, and while using 0.01 M NaCl as the feed solution. A flow rate of over 1 ml/minute/gram of carbon under these conditions indicates improved function due to higher capacitance and lower ESR. For example, selection of an edge plane containing material, preferably a material with greater than 10% of the surface area comprising exposed edge planes, with a capacitance of greater than 20 farads per gram, can be used to achieve low resistance electrodes when used in a capacitor, for example, a capacitor with a series resistance of less than 100 ohms, for example, or less than 30–200 ohms per square centimeter of the spacer layer, optimally, less than 30 ohms per square centimeter of the spacer layer, or less than 20 ohms cm of electrode material as measured in concentrated sulfuric acid, 0.6 M NaCL, or any feed solution desired to be purified in flow-through capacitors.

The edge plane electrodes of the invention may also be combined with small particle size, for example, under 10 microns, preferably, 1 micron or less. Small particle size further decreases ESR and further increases the degree of utilization of surface area. Edge plane materials have surface areas, typically, from 20 to 3000 square meters per gram as measured by B.E.T, iodine number, or nitrogen adsorption methods.

Selection of a conductive material for use in a capacitor electrode in a flow-through capacitor can be a form of carbon with a surface area specific capacitance of over 5 microfarads per square centimeter of surface area will suffice for purposes of this invention. Surface area here is the microscopic or nanoscopic area of the carbon material, as measured by either of the iodine number, B.E.T., or nitrogen adsorption methods. This includes activated carbon, carbon black, carbon powder, fibers, spheres, and carbonized polymers. One preferred embodiment of the present invention is to bind together particulate, granular, or powder forms of any of the above materials in 1–20% of a per fluorocarbon, polymer, or PTFE binder, and to form the mixture into a sheet material of less than 0.05 inches thick, for example, 0.005 to 0.02 inches thick.

Because of its low cost and ease of manufacture into sheet form, mechanically-aligned graphite is a preferred embodiment of this invention. Aligned graphites exist in the form of pyrolytic graphite, graphite particles, and aligned nanofibers or nanotubes. This material is expensive. Mechanically-aligned graphite, known as graphite foil, is an inexpensive, convenient material in sheet form. It has been discovered that this material has aligned graphite layers formed by the mechanical action of the manufacturing process. Carbonized polyimide sheet is another useful material that provides aligned graphitic conductive layers. Aligned graphite or conductive layers may be used to form high capacitance fringe-field capacitors by the exposure or cutting across of these aligned graphite edge planes. The aligned material ideally will be comprised of stacked conductive layers with a thickness of 1 nanometer or less per layer and a packing distance of 20 nanometers or less per layer, preferably 1 nanometer or less.

The electrode of the present invention may be manufactured by extrusion or calendaring and formed into rolls of material. Rolls of electrode material of the present invention may be placed onto spindles and fed together onto a central axis either together with, or interleaved with, layers fed from rolls of current collector and/or spacer material in order to form spiral-wound or robotically-manufactured, spiral-wound or flat-stacked capacitors, or electrochemical cells made from electrode, spacer, and optionally, current collector. These layers may either be separate, integral, or bonded, in any combination. Alternatively, any combination of electrode, current collector, and/or spacer layer may be laminated or bonded together first, then subsequently fed off rolls or manufactured by any roller, textile, stacking, or robotics method, to form stacked, flat, or spiral-wound electrochemical cells or to form flow-through capacitors.

A hydrophilic or membrane layer may also be coated onto, or impregnated into, the electrode in order to improve electrical properties and decrease particle erosion. Superabsorbent polymers such as cross-linked polyacrylic acid, acrylamide, or hydrogels are especially efficacious. These polymers may be further derivitized with ionic groups, such as sulfate or amine, strong or weak acid or basic groups, in order to form integral ion or proton exchange membranes for using in fuel cells or for using as a charge barrier layer in a flow-through capacitor use.

Figure 7:
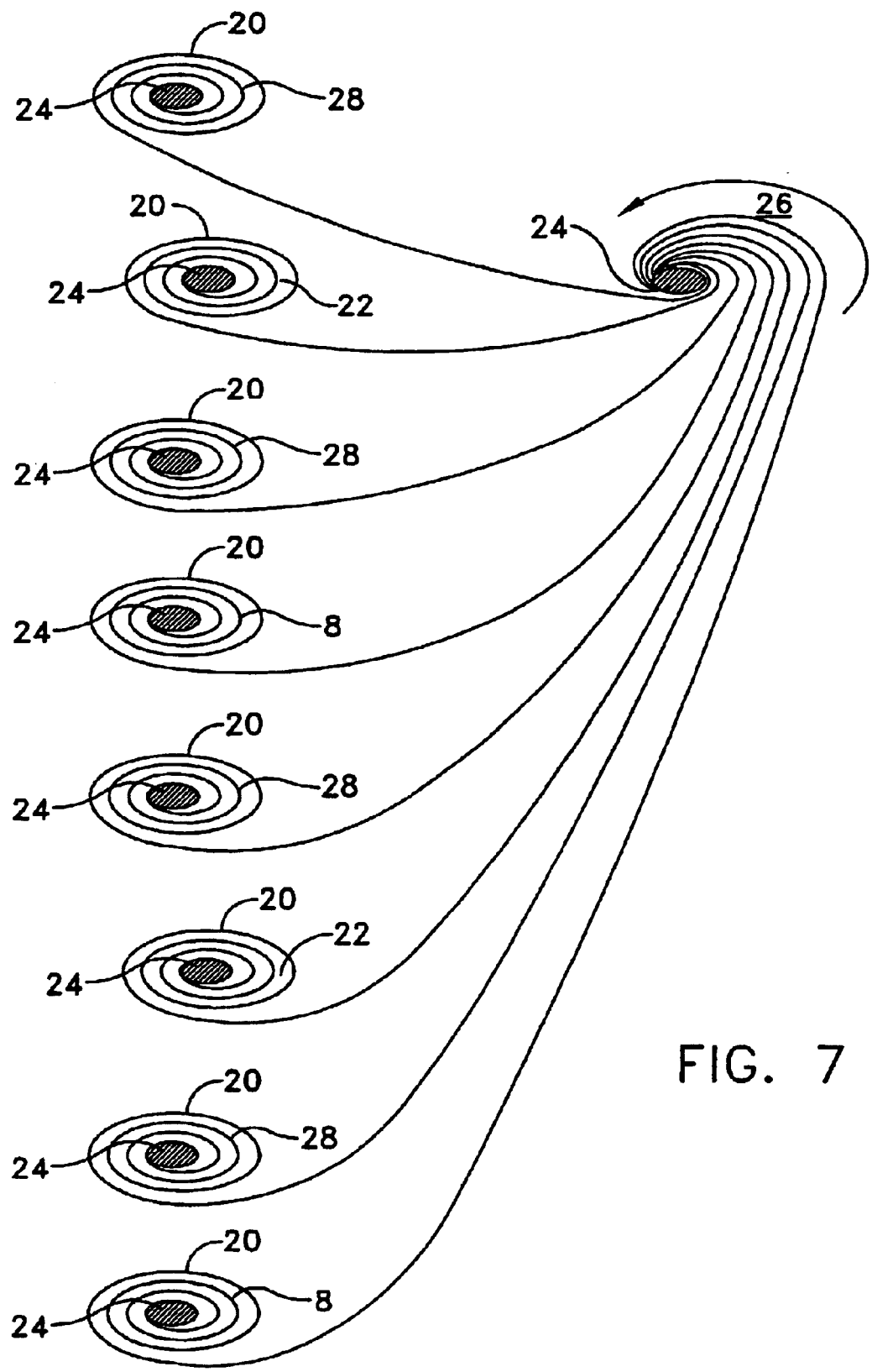
FIG. 7 is a schematic showing a process for making an electrochemical device of the invention in which layers of capacitor electrodes are interwound with layers of current collector and spacer.

A spiral wound flow-through capacitor manufacturing process is shown in FIG. 7. FIG. 7 is a central spindle and/or removable shaft upon which layers are attached for spiral winding in order to form a spiral wound flow-through capacitor or electrochemical cell 18. Rolls 20 are electrode layers which interleave with current collector layer 22. Spacer layer 8 separates two double-sided electrodes to form anode/cathode pairs. This figure shows eight separate electrode 16, current collector 22, and spacer 8 layers. However, the electrode 16 may be previously integrated, bonded, or wound together with the spacer 8 or current collector 22 layers or both spacer 8 and current collector 22 layers.

Alternatively to spiral wound, electrode 16 and/or spacer 8 and current collector 22 layers, laminated together or separately, may be unreeled from rolls 20 fed into an automated machine, robot, or alignment jig in order to interleave an electrochemical cell from flat stacked layers. Current collector layers 22 may extend out either end in order to form extending electrical leads when all the layers are stacked or rolled together.

Dancers, not shown, can adjust the tension. Spiral winding and reeling off of rolls may be automated with motors or utilize any manufacturing technique known to the textile industry that is used to form rolls of material or laminate materials together.

An additional electrically and ionically insulating layer may be inserted between capacitor layers in order to form electrically and ionically insulating series capacitors.

Edge planes may also be exposed by laminating graphite foil or other edge plane material with glue or other means and subsequently skiving the material across the edge planes, in order to expose the edge planes and simultaneously to form thin sheets, rods, or other convenient electrode shapes. An alternative method is to form arrays of holes, slots, or other cut patterns, more or less perpendicular to the graphite foil sheet. Generally, the smaller and more tightly packed the holes, slots, or other indentations, the greater the cut or etched surface area, and hence, the greater the capacitance will be. Pores or holes may be made by any means, including chemically or mechanically. Pores may be micro, macro, meso, or combinations of the above.

The smaller and more numerous the holes the better. The surface area of an array of holes cut into a flat sheet is directly proportional to the thickness of the sheet material and inversely proportional to the diameter of the holes. In order to utilize thinner, less resistive material, it is therefore desirable to use many holes with narrow as diameter(s). Preferably, enough holes, slots, or pores will be present so that over 10% of the material will be open area. The aspect ratio, or the ratio of depth to diameter, should be as high as possible. Similarly, slots or any other shape cut into the plane of the graphite foil will preferably have a high aspect ratio. An aspect ratio of greater than 2 to 1 is desirable. Aspect ratios greater than 7 to 1 provide optimal results.

One preferred method to achieve numerous small holes, less than 1 micron in diameter, is through chemical means. Holes of less than 200 nm, such as less than 20 nm, are possible.

Mechanical, chemical perforation, or hole drilling into graphite foil opens up flow channels that naturally exist in this material, which are more or less parallel to the surface. Graphite foil may further be opened up by any means which exfoliates the graphite material.

Alternatively, graphite particles may be chemically reacted with catalyst or other means in order to increase its surface area to over 10 square meters per gram, up to 3000 square meters per gram, and in the process, expose edge planes. For example, graphite flakes in the 1 to 400 micron size range are reacted with any metal catalyst or chemical combination that reacts with basal planes of graphite, exposes edge planes, or cuts through successive layers of edge planes. In the process of exposing edge planes, the surface area of graphite is increased to over 20 square meters (as measured by the B.E.T or nitrogen adsorption method) per gram. Reactions which expose edge plane may be enhanced by opening up the graphite structure, for example, by exfoliation, creating bisulfate or bisulfite addition products, or using previously exfoliated graphite.

Examples of exfoliation include, but are not limited to U.S. Pat. No. 6,149,972, hereby incorporated by reference. These particles may subsequently be formed into a pure graphite sheet by any process used to make graphite foil. Examples of graphite sheet forming from particles include, but are not limited to: U.S. Pat. Nos. 4,752,518; 3,404,061; 6,143,218; 4,102,960; and 5,985,452, hereby incorporated by reference. Alternatively, the particles may be mixed with a binder, such as latex, phenolic, resins, or polymers. A preferred embodiment is the use of fibrillatable binders, such as PTFE, preferentially 2–20% PTFE, and subsequently formed into sheet material by any sheet-forming process including calendaring, extrusion, pressing, spraying, coating, including adhering or coating onto substrates, rollers, spacers, or current collectors. The binder edge plane material sheet forms an enhanced edge plane sheet material for use in fuel cells, batteries, capacitors, flow-through capacitors, or charge barrier flow-through capacitors for water purification or energy generation or storage. Once formed into sheet material, holes may be drilled more or less perpendicular to the surface in order to let water into the electrode structure. Pore-forming agents may also be incorporated into the sheet-forming process. Any evaporatable, sublimatable, ablatable, or dissolvable powder material, such as polymers, organic materials, and sugars and salts, may be used as a pore-forming agent by mixing in with the electrode material, turning into a sheet, and removing the pore-forming agent by pyrolysis, washing, or other means to leave behind pores.

Holes may be made into graphite foil material or an edge plane particle sheet, both to open up and expose the channels within the material to electrolyte, to create additional edge planes, or to open up the interior of the graphite foil for subsequent chemical reactions that etch the graphite, increase its surface area, or expose additional edge planes.

Holes may be made by laser or electric discharge machining (EDM). Simple mechanical means, such as punching and pinholing may also be used. Smooth-edge, clean-cut holes are preferable. To make lots of small holes, a line laser may be run through a mask. A refractory mask may also be used to burn holes with a blow torch. A porcupine roller may also be used. Any hole, slot, or other means may be used which makes cuts or pores generally across the edge plane layers. Chemical, electrochemical, or photolithographic means may also be employed. Any method known to technology which makes lots of small holes or pores in carbon materials may be used to make holes, pores, or other vias that cut across and therefore expose edge planes according to this invention.

The number of holes, slots, or other means to expose edge planes should be sufficient such that a facing square centimeter of the flat stock material should have a capacitance of 0.01 farads or greater. A material with aligned edge planes may be identified by the fact that it has greater conductivity in the x and y direction then along the z direction, where the z direction is that direction normal to the plane of a sheet of width x and height y. This material is made into the electrode of the invention by the introduction of holes, pores, slots, or other cuts perpendicular to the edge planes of the original stock material that have the effect of creating a capacitance at least 30% more than the same sheet of material without holes, or slots, or pores. This stock material may, for example, be comprised of either graphite foil or material containing graphite platelets, where the platelets have been mechanically aligned within the foil, so they are normal to the sheet material surface. This may be accomplished by calendering exfoliated graphite into graphite foil. Capacitance is increased by opening up channels within graphite material or by exposing more edge planes.

Once edge planes are exposed, the surface area of the edge planes may be further increased by any activation means used for carbon, including nitric acid, phosphoric acid, potassium hydroxide activation, steam or other thermal activation, or a neutron source, etc. Plasma etching may also be employed in order to activate the carbon, including oxygen and argon plasma. An oxygen plasma blow torch in air or a more controlled plasma may be used according to any standard plasma-etching procedure such as is used in the semiconductor industry. Boron or phosphorous may be used with any method that etches carbon, including catalytic methods, as an edge plane protecting group in order to achieve and preserve high aspect ratios. Halogen and fluorine-containing compounds or atoms make excellent etchants of basal plane graphite for use in this invention.

Graphite electrodes with aligned through holes may be further utilized to make a capacitor where the flow is through aligned through holes, where the holes in the material layers form the flow path. This enables the spacer to be, optionally, completely nonporous. For example, graphite foil may be laminated with a nonporous polymer. The laminate may be subsequently calendered, if desired, in order to thin the layers. Subsequent to lamination, through holes may be formed through the layers laminate block. Alternatively, a spacer may be used where the spacer forms the flow path. Where the spacer is used to form a flow path, the spacer may be a biplanar filtration netting, open netting, filtration media, porous filter paper, or simply any means to space or shim apart the electrodes in order to prevent short circuit of electrons between the electrodes. Where the holes themselves are used as the flow path, the spacer may, optionally, be a nonporous dielectric material, for example, a layer of polymer material.

To further enhance the capacitance, any high capacitance material may be incorporated and filled into the holes, grooves, trenches, pits, or other cut-away shapes. For example, nanotubes can be grown parallel to the flat sheet from the sides of the holes. In another example, high capacitance carbon materials may be incorporated into and attached to the holes.

A flat sheet material which, in and of itself, has a high proportion of edge planes may also be used to enhance the electrode performance, due to its intrinsic fringe-field effects, in addition to the modifications made by cutting vias, pathways, or holes into the material.

Other preferred methods of manufacture are chemical, catalyst enhanced, photochemical, microwave mediated, oxygen, fluorine, or other plasma, or electrochemical etching, such as in a hydrogen fluoride solution. This may be combined with photolithography in order to make vias. Any method of electrochemical etching of carbon known to the art will suffice according to this invention. For example, HF of 0.1 M or less may be used at 2 volts for 10 minutes, in order to etch graphite foil, for example, photo masked graphite foil similar to U.S. Pat. No. 5,997,713 used for silicon.

EXAMPLES

Example 1

Multiple layers of graphite foil, 0.004 inches thick, are laminated with a dielectric spacer and subsequently cut through with an array of 0.001 inch through holes, hexagonally staggered every other diameter and tightly packed. Bunny ear leads out either end of this laminate stack connect to DC power to form multiple anode-cathode pairs. The through-hole stack is put inside a pressure tight cartridge holder, so that the through holes form flow paths. This device may be used as a flow-through capacitor for water purification.

Example 2

Graphite foil, 0.03 inches thick, is mechanically drilled or punched with an array of 0.04 inch through holes. Subsequently, the exposed edge planes are activated in order to form a highly electro active electrode material for use in lithium ion batteries, fuels cells, capacitors, and other electrochemical cells.

Example 3

Graphite foil, 0.005 inches thick, is laminated with phenolic resin, carbonized, and subsequently skived to form 0.005 inch sheets with exposed edge planes. The resulting material is used in an electrode for a vanadium redox battery.

Example 4

A porous polyimide sheet material is carbonized in order to form an aligned graphite sheet material with ready-made pores. The resulting material may be used, as is, for a highly electro active electrode material for use in electrochemical cells.

Example 5

Graphite foil is infiltrated with boron and phosphorous as an edge plane protecting group prior to and during activation, in order to form holes with high aspect ratios.

Example 6

A laser beam is used to dig parallel 0.010 inch trenches every trench diameter apart in 0.030 inch graphite foil, in order to form an electrode material for use in flow-through capacitors.

Example 7

Electric discharge sparks are used to cut through holes into 0.05 inch diameter graphite foil, in order to form a highly electro active electrode material. The resulting material is subsequently layered with an open netting spacer, in order to form an electrochemical cell.

Example 8

Graphite flakes, multiwall nanotubes, nanotubes, or carbon fibers are aligned through extrusion in a polymer matrix, subsequently skived or calendered into edge plane sheets, then pyrolyzed, in order to form an edge plane material of high electro activity.

Example 9

A 0.004 inch graphite sheet with staggered arrays of 0.001 inch slots is aligned, so that the slots form parallel flow paths. A flow-through or porous spacer is selected for low pressure drop in order to space apart the alternating electrodes and to form an alternative flow path perpendicular to the flow paths formed by the through holes.

Example 10

Graphite foil, 0.004 inches thick, is cut with through holes or partial holes from 0.001 to 0.004 inches long and less than 25 microns in diameter, most of which are less than 10 microns in diameter. The resulting material is used, as is, together with a porous spacer material, in order to form an electrochemical cell.

Example 11

The electrode of the present invention is used with a nafion material as a spacer and is impregnated with a platinum catalyst, in order to form a fuel cell.

Example 12

The electrochemical cell of the present invention is used together with a high temperature, molten salt electrolyte and a high temperature tolerant spacer, such as glass or ceramic fiber cloth, in order to form a fuel cell.

Example 13

Graphite foil is etched with pits, slots, or troughs smaller than 25 microns across that have an aspect ratio of greater than 10 to 1, in order to form a high performance electrochemical electrode material.

Example 14

Graphite foil 0.030 inches thick is punched, cut, or drilled with 0.04 inch diameter through holes, hexagonally staggered every 0.04 inches apart. An activated carbon phenolic mixture is toweled into the holes and carbonized in order to create a flat surface with the high capacitance material in the same plane as the current collector. An extra thin spacer made from 0.002 inch screen printed or photolithographically made polymer bumps is attached directly onto the flat side of the material to form an integral spacer.

Example 15

Edge plane material is catalytically etched by the slow introduction of small amounts of a metal-containing material or metal particles or other catalyst particle material. The slow introduction of catalyst allows the catalyst to dig down into the edge plane material, so that individual catalyst particles maintain their separation from other catalyst particles. In so doing, they form small etch holes or pits to form a highly electro active electrode for battery and flow-through capacitor use.

Example 16

Graphite is formed into an intercalation compound with a metal catalyst, in order to disperse the metal in such a way that the subsequent catalytic oxidation forms small vias, pores, or slots. The resulting material may be incorporated into a high performance electrode for electrochemical cell use.

Example 17

Multiwall nanotubes are pockmarked by oxygen plasma or other activation means, in order to expose edge planes, in order to offer a high capacitance electrode material.

Example 18

Edge plane nanotubes or nanofibers with a diameter of between 5 and 200 nm are formed into a sheet material for use as a high activity electrode material for use in any electrochemical device, including fuel cells, batteries, capacitors, flow-through capacitors for water purification, and charge barrier capacitors for energy recovery from salt water and for desalination, with over 20 farads per gram as measured in concentrated sulfuric acid.

Example 19

Edge plane nanotubes are used in an electrolyte that is selected so as to minimize oxidation or reduction reactions, and to minimize the extra peak observed in a cyclic voltamogram. Electrolytes include aqueous or organic solutions with a pH over 7.0, including the use of OH ions.

Example 20

Edge plane material, including graphite that has been treated to expose its edge planes, chemically-etched graphite powder, edge plane nanotubes of nanofibers, etched multiwall nanotubes, spherical, fibrous, or cylindrical materials, such as mesophase pitch or polymer precursors pyrolyzed to create a carbon material with exposed edge planes, or any of the above materials further activated to increase surface area, mixed with PTFE binder at a ratio of more than 80% carbon and less than 20% PTFE, for example, 5% PTFE material, and formed into a sheet electrode by calendaring, extruding, or pressing into flat sheets of less than 0.1 inch thick, for example, 0.03 inches thick or less, are used as a flexible, edge plane electrode material, with or without optional current collectors.

Example 21

The electrodes of the present invention may be integrally manufactured with spacer or current collector means. For example, graphite or metal foil current collectors, and any spacer means, may be laminated with a binder directly onto the electrode material.

Example 22

Edge plane nanofibers between 10 and 50 nm wide, and between 0.5 and 10 microns in length, are compacted in a roller, calender, extruder, press, or are flow aligned in order to obtain a high capacitance to low pore volume fringe-field electrode of the present invention, with over 20 farads per pore cc, as measured by nitrogen adsorption or B.E.T. methods, for use in electrochemical cells.

Example 23

Graphite particles of under 1000 microns particle size are exfoliated with sulfuric acid, mixed together with etchant chemicals or with a catalyst, and chemically reacted, such as at temperatures of over 100° C., in order to etch pores through successive layers of graphite planes. The resultant material has a surface area of over 20 square meters per gram. Subsequently, these graphite particles may be made into a sheet, mixed with a binder or rolled or calendered into graphite foil with a high capacitance for use as a fringe-field electrode of the present invention.

Example 24

Carbonized mesophase pitch fibers with exposed edge planes are selected for use in the fringe-field electrode of the present invention, for application in electrochemical cells and flow-through capacitors.

Example 25

A flow-through capacitor uses the high capacitance electrode of the present invention to achieve higher performance for use in any feed solution. When separately tested with a 0.01 M NaCl test solution, this flow-through capacitor will purify the 0.01 M NaCl test solution to 0.001 M or better, when tested at one of either 1 or 2 volts and at a flow rate of over 1 milliliter per minute per gram of electrode carbon material. Single electrode capacitance of electrodes is as measured in concentrated sulfuric acid or in 0.6 M NaCl to be over 20 farads per gram. The single electrode capacitance may be measured using the flow-through capacitor cell, or other capacitor cell, and is calculated by dividing the result by two.

Example 26

A flow-through capacitor uses the high capacitance electrode of the present invention to achieve higher performance for use in any feed solution. When separately tested with a 0.01 M NaCl test solution, this flow-through capacitor will purify the 0.01 M NaCl test solution to 0.001 M, or better, when tested at one of either 1 or 2 volts and at a flow rate of over 1 milliliter per minute per gram of electrode carbon material. Surface specific microcapacitance of the electrodes selected for use are over 5 microfarads per square centimeter of electrode surface area, as measured by either the B.E.T or nitrogen adsorption method.

Example 27

Graphite flakes or particles are laminated onto the electrode of the present invention by binder, polymer, resin, thermal, or mechanical means in order to form an integral current collector layer.

Example 28

A graphite platelet or particle is chemically or catalytically etched with multiple pores that penetrate through successive edge plane layers within the platelet. The pores are between 1 and 300 nm wide, for example, less than 20 nm wide. The resulting surface area of the graphite is over 100 B.E.T., for example, 500 B.E.T., or as measured by nitrogen adsorption method.

What is claimed is:

1. An electrochemical device comprising at least two capacitor electrodes, each of said two capacitor electrodes comprising a conductive material characterized in that at least 10% of the surface area of said conductive material is an edge plane.

2. The electrochemical device of claim 1, wherein said electrochemical device is a flow-through capacitor.

3. The electrochemical device of claim 2, wherein said electrochemical device has a single electrode capacitance of at least 20 farads per cubic centimeter of electric material.

4. The electrochemical device of claim 2, wherein said electrochemical device has a single electrode capacitance of at least 5 microfarads per square centimeter of surface area.

5. The electrochemical device of claim 4, wherein said conductive material comprises particles of less than 10 microns in diameter.

6. The electrochemical device of claim 5, wherein said conductive material has a surface area of between 20 and 3000 square meters per gram material.

7. The electrochemical device of claim 5, wherein said conductive material is selected from the group consisting of pyrolytic graphite and graphite particles.

8. The electrochemical device of claim 5, wherein said conductive material is selected from the group consisting of nanofibers, nanotubes, and carbon fibers of less than 100 microns in diameter.

9. The electrochemical device of claim 5, wherein said conductive material is selected from the group consisting of carbon black and carbon nanoparticles.

10. The electrochemical device of claim 5, wherein said conductive material is selected from the group consisting of activated carbon and carbon powder.

11. The electrochemical device of claim 5, wherein said conductive material is selected from the group consisting of mechanically aligned graphite.

12. The electrochemical device of claim 4, wherein said edge planes are protected by boron or phosphorous.

13. The electrochemical device of claim 4, wherein said conductive material is a nanofiber of less than 300 nanometers in diameter.

14. The electrochemical device of claim 2, wherein said capacitor electrode further comprises a binder material.

15. The electrochemical device of claim 14, wherein said binder material is selected from the group consisting of latex and a phenolic resin.

16. The electrochemical device of claim 14, wherein said binder material is a perfluorocarbon.

17. The electrochemical device of claim 14, wherein said binder material is a polymer fiber.

18. The electrochemical device of claim 14, wherein said binder material is a polytetrafluoroethylene (PTFE) polymer.

19. The electrochemical device of claim 14, wherein said binder material is in the form of a flexible sheet of less than 0.03 inches thick.

20. The electrochemical device of claim 2, wherein said electrochemical device further comprises a current collector, and said capacitor electrode is either integral with, or in the same plane as, said current collector.

21. The electrochemical device of claim 2, wherein one or more of the edge planes of said conductive material are located on one or more of a branch, a dendrite, a fork, a jagged edge, a fractal edge, a point, a spine, or a protrusion in said conductive material.

22. The electrochemical device of claim 2, wherein said conductive material is a laminate comprising graphite, and said graphite is electrically integral with said current collector.

23. The electrochemical device of claim 2, wherein said electrochemical device further comprises a spacer layer, and said flow-through capacitor has a series resistance of less than 30 ohms per square centimeter of spacer layer.

24. The electrochemical device of claim 2, wherein said capacitor electrode comprises one or more pores through which an aqueous, conductive solution can pass through said capacitor electrode, and said edge planes of said conductive material are located on the surface of said pores.

25. The electrochemical device of claim 2, wherein said flow-through capacitor is used to remove ions from an aqueous medium so as to purify said aqueous medium, and said flow-through capacitor is able to remove at least 90% of said ions when said medium is a solution of 0.01M NaCl, said conductive material in said capacitor electrode is carbon, and said solution is allowed to flow through said flow-through capacitor at a flow rate of at least one milliliter per minute per gram of carbon at 2 volts.

26. A method of removing ions from an aqueous medium, said method comprising the steps of:
    (a) providing the flow-through capacitor of claim 2;
    (b) allowing an electric current to flow between two capacitor electrodes of said flow-through capacitor; and
    (c) allowing a source of aqueous medium to flow through said flow-through capacitor so as to remove said ions from said medium.

27. The method of claim 26, wherein said method is able to remove at least 90% of said ions when said medium is a solution of 0.01M NaCl, said conductive material in said capacitor electrode is carbon, and said solution is allowed to flow through said flow-through capacitor at a flow rate of at least one milliliter per minute per gram of carbon at 2 volts.

28. A method of making an electrochemical device, said method comprising the steps of:
    (a) providing at least two capacitor electrodes, wherein each of said two capacitor electrodes comprise a conductive material characterized in that at least 10% of the surface area of said conductive material is edge plane; and
    (b) positioning a source of electrical current so as to provide electrical communication between each of said two capacitor electrodes.

29. The method of claim 28, wherein said capacitor electrode has a capacitance of at least 20 farads per cubic centimeter of electrical material.

30. The method of claim 28, wherein said capacitor electrodes have a single electrode capacitance of at least 5 microfarads per square centimeter of surface area.

31. The method of claim 28, further comprising the step of mixing said conductive material with a binder material.

32. The method of claim 31, further comprising the step of forming said binder material into a flexible sheet of less than 0.03 inch thickness, said forming selected from the group consisting of extruding, calendaring, pressing, adhering said sheet onto a current collector, and spray coating.

* * * * *